United States Patent
Chan et al.

(10) Patent No.: US 12,413,531 B2
(45) Date of Patent: Sep. 9, 2025

(54) SYSTEMS AND METHODS FOR BUFFER STATE REPORTING AND DATA BURST ALIGNMENT

(71) Applicant: Meta Platforms Technologies, LLC, Menlo Park, CA (US)

(72) Inventors: Yee Sin Chan, San Francisco, CA (US); Zhu Ji, Cupertino, CA (US); Curt Wong, Bellevue, WA (US); Xiaodi Zhang, San Ramon, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/498,424

(22) Filed: Oct. 31, 2023

(65) Prior Publication Data

US 2024/0154915 A1 May 9, 2024

Related U.S. Application Data

(60) Provisional application No. 63/422,261, filed on Nov. 3, 2022.

(51) Int. Cl.
| | |
|---|---|
| *H04W 76/27* | (2018.01) |
| *H04L 47/30* | (2022.01) |
| *H04L 49/901* | (2022.01) |
| *H04W 72/14* | (2009.01) |
| *H04W 74/08* | (2024.01) |

(52) U.S. Cl.
CPC ............ *H04L 47/30* (2013.01); *H04L 49/901* (2013.01)

(58) Field of Classification Search
CPC ....... H04L 47/30; H04L 49/901; H04L 12/56; H04W 76/27; H04W 72/14; H04W 74/08; H04W 80/10
USPC .......................................................... 709/224
See application file for complete search history.

(56) References Cited

U.S. PATENT DOCUMENTS

| | | | |
|---|---|---|---|
| 2012/0069829 A1* | 3/2012 | Cote | H04W 28/02 370/338 |
| 2017/0230860 A1* | 8/2017 | Li | H04W 28/0278 |
| 2018/0198738 A1* | 7/2018 | Norige | H04L 43/0894 |
| 2019/0037600 A1* | 1/2019 | Urabayashi | H04W 16/14 |
| 2019/0090292 A1* | 3/2019 | Tabet | H04W 76/14 |
| 2019/0335355 A1* | 10/2019 | Agarwal | H04W 52/0216 |
| 2020/0288489 A1* | 9/2020 | Wang | H04W 72/12 |

* cited by examiner

Primary Examiner — Jude Jean Gilles
(74) Attorney, Agent, or Firm — Foley & Lardner LLP

(57) ABSTRACT

Disclosed herein are aspects related to a device that can include a wireless communication interface and one or more processors. The one or more processors can generate a plurality of data packets. The one or more processors can allocate the plurality of data packets to a buffer for transmission to a network device. The one or more processors can determine an indication of a remaining time for transmission of at least one data packet of the plurality of data packets. The one or more processors can cause transmission, using the wireless communications interface, of the indication of the remaining time to the network device.

20 Claims, 7 Drawing Sheets ent application claims the benefit of and priority
SYSTEMS AND METHODS FOR BUFFER STATE REPORTING AND DATA BURST ALIGNMENT

CROSS-REFERENCE TO RELATED APPLICATIONS

The present application claims the benefit of and priority to U.S. Provisional Application No. 63/422,261, filed Nov. 3, 2022, the disclosure of which is incorporated herein by reference in its entirety.

FIELD OF DISCLOSURE

The present disclosure is generally related to communication for rendering artificial, mixed, virtual, or extended reality, including but not limited to systems and methods for buffer state reporting and/or data burst alignment.

BACKGROUND

Artificial/extended reality (XR) such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

SUMMARY

Systems that implement XR can transmit data to and receive data from remote devices, such as network base stations, as part of providing XR experiences. Due to various factors including size, weight, and power considerations, it can be useful for such systems, such as portable user equipment (UE) devices, to control or limit the durations in which wireless communications are active for transmission and/or reception operations. However, such control can affect quality of service (QoS) of the XR experience, such as by affecting latency; similarly, XR data, such as video frames to be presented in an order, may be expected to be delivered according to a periodic schedule (e.g., frame rate), and thus such systems can cause data to be discarded rather than transmitted/received after the data would be useful, which can affect (e.g., reduce) QoS. In addition, while some network devices can provide instructions to UEs for operation timing, such as timing for reception of data, the network devices may lack information to provide such instructions in a manner that takes into account QoS factors. For example, while UEs can provide information indicating an amount of data buffered for transmission, this information may not include latency information (e.g., latency criteria, such as QoS factors) associated with the buffered data.

Systems and methods in accordance with the present disclosure can facilitate both QoS and power saving considerations in devices that provide XR experiences, such as to enable a latency-aware scheduler to more effectively schedule networking traffic while maintaining power saving considerations and/or improving power saving. For example, a UE can allocate data packets to a buffer for transmission to a network device. The UE can determine an indication, such as a metric, of a remaining time for transmission of at least one data packet of the plurality of data packets. The metric can be determined based on or otherwise relate to a threshold for how long the at least one data packet is to be maintained in the buffer before being discarded (e.g., where the information in the at least one data packet would be stale if held longer in the buffer than the threshold before being transmitted to the network device). The at least one data packet can represent periodic data and/or be expected to be transmitted on a periodic basis, such as a fixed periodicity. For example, the at least one data packet can represent video frames of XR content to be transmitted in accordance with a fixed frame rate for presentation of the XR content. The UE can transmit the indication during an on duration of reception operation of wireless communications electronics of the UE (e.g., as part of a reporting communication that the UE generates regarding the buffer), which can facilitate power saving. The network can determine, according to the indication received from the UE, instructions for operation of the UE for transmission of the at least one data packet, such as scheduling information for scheduling the transmission relative to on and/or off durations of operation of wireless communication electronics of the UE. This can allow the network device to schedule the transmissions in a manner that allows the UE to more effectively communicate data packets consistent with the QoS criteria and/or to more effectively manage power usage.

Various implementations disclosed herein are related to a device that can include a wireless communication interface and one or more processors. The one or more processors can generate a plurality of data packets. The one or more processors can allocate the plurality of data packets to a buffer for transmission to a network device. The one or more processors can determine an indication of a remaining time for transmission of at least one data packet of the plurality of data packets. The one or more processors can cause transmission, using the wireless communications interface, of the indication of the remaining time to the network device.

In some implementations, the wireless communications interface can operate, for wireless data reception, in an on mode or an off mode, and to transmit the indication of the remaining time during operation in the on mode. In some implementations, the one or more processors can receive, from the network device, an instruction of a period for the wireless communications interface to operate in an on mode. In some implementations, the one or more processors can cause the wireless communications interface to transmit the at least one data packet during the period.

In some implementations, the indication of the remaining time corresponds to an amount of time for the at least one data packet to be in the buffer before being discarded. In some implementations, the one or more processors are to select the at least one data packet from the plurality of data packets responsive to the at least one data packet having a fixed periodicity. In some implementations, the indication includes a buffer status report.

In some implementations, the one or more processors are configured to generate the indication of the remaining time to include an offset between a start time of reception by the wireless communications interface and a start time of transmission of the at least one data packet. In some implementations, the one or more processors are configured to transmit, using the wireless communications interface, the indication of the remaining time for transmission of the at least one data packet prior to transmission of the at least one data packet to the network device.

In some implementations, the one or more processors are to use the wireless communications interface to communicate the plurality of data packets as a plurality of first data packets forming a first data burst and a plurality of second data packets forming a second data burst. The first data burst can have a first period between consecutive packets of the plurality of first data packets, and the second data burst can have a second period between consecutive packets of the plurality of second data packets. The first period and the second period can each be less than a third period between the first data burst and the second data burst.

Various implementations disclosed herein relate to a system. The system can include a first device and a second device. The first device can include one or more first processors to determine an indication of a remaining time for transmission of a plurality of data packets allocated to a buffer. The second device can include one or more second processors to receive the indication from the first device. The one or more second processors can determine, according to the indication, instructions for timing for the first device to transmit the plurality of data packets from the buffer.

In some implementations, the first device includes a wireless communications interface configured to operate, for wireless data reception, in an on mode or an off mode. The wireless communications interface can transmit the indication of the remaining time during operation in the on mode. In some implementations, the one or more first processors are configured to transmit, using the wireless communications interface, the indication of the remaining time for transmission of the at least one data packet prior to transmission of the at least one data packet to the network device. In some implementations, the plurality of data packets include a plurality of protocol data units (PDUs) arranged as a plurality of PDU sets.

In some implementations, the indication of the remaining time corresponds to an amount of time for the plurality of data packets to be in the buffer before being discarded. The plurality of data packets can have a fixed periodicity. In some implementations, the one or more first processors can generate the indication of the remaining time to include an offset between a start time of reception by the wireless communications interface and a start time of transmission of the at least one data packet.

Various implementations disclosed herein relate to a method. The method can include generating, by one or more processors, a plurality of data packets. The method can include generating, by one or more processors, a plurality of data packets. The method can include determining, by the one or more processors, an indication of a remaining time for transmission of at least one data packet of the plurality of data packets. The method can include transmitting, by the one or more processors using the wireless communications interface, the indication of the remaining time to the network device.

In some implementations, the method includes transmitting, by the wireless communications interface, the indication of the remaining time during operation of the wireless communications interface in an on mode of a discontinuous reception cycle. In some implementations, selecting, by the one or more processors, the at least one data packet from the plurality of data packets responsive to the at least one data packet having a fixed periodicity. In some implementations, the method includes determining, by the one or more processors, the indication of the remaining time according to an amount of time for the at least one data packet to be in the buffer before being discarded.

In some implementations, the method includes receiving, by the one or more processors from the network device, an instruction of a period for the wireless communications interface to operate in an on mode. In some implementations, the method includes causing, by the one or more processors, the wireless communications interface to transmit the at least one data packet during the period.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
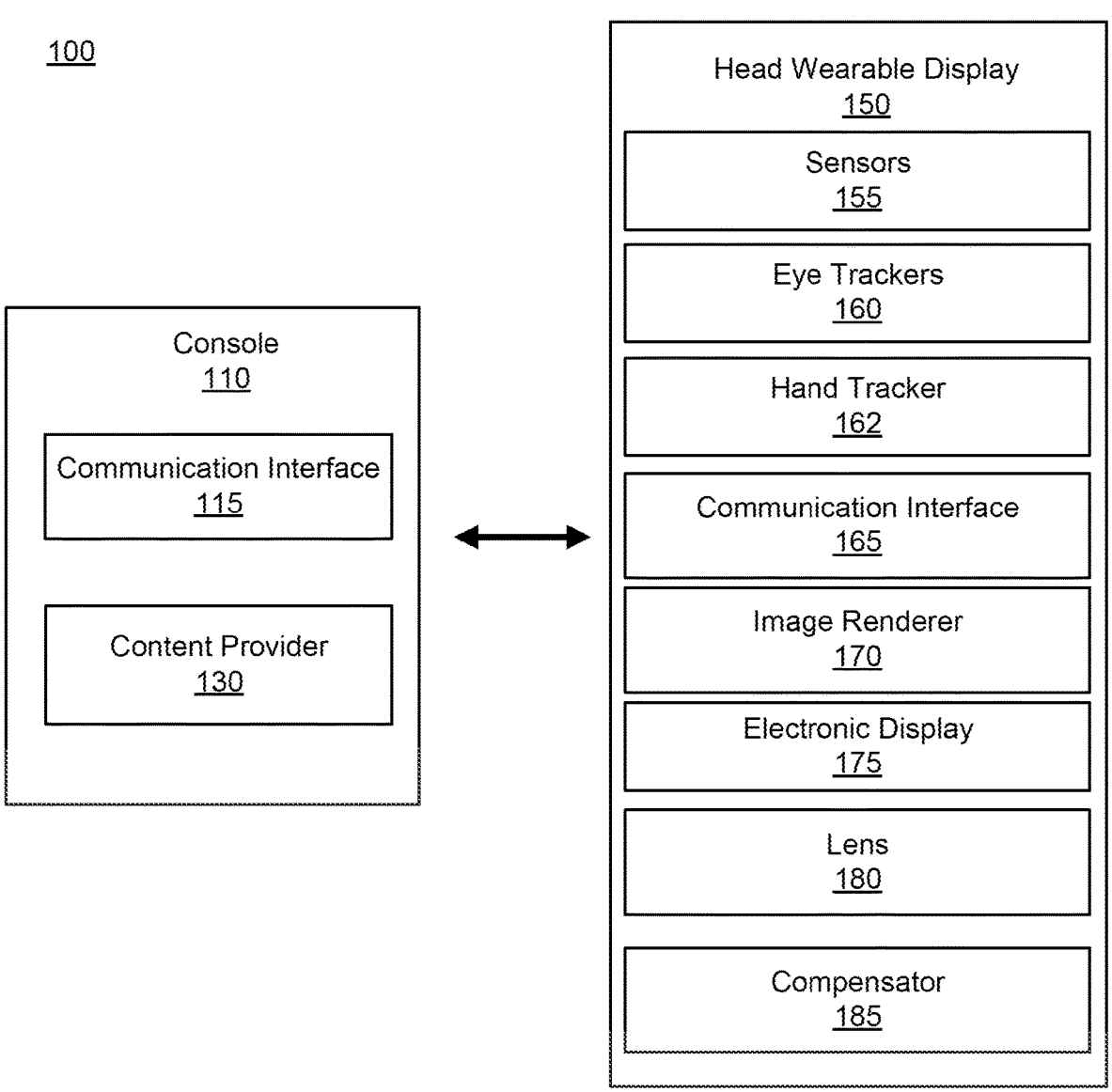
FIG. 1 is a diagram of a system environment including an artificial reality system, according to an example implementation of the present disclosure.

Before turning to the figures, which illustrate certain implementations in detail, it should be understood that the present disclosure is not limited to the details or methodology set forth in the description or illustrated in the figures. It should also be understood that the terminology used herein is for the purpose of description only and should not be regarded as limiting.

Systems and methods in accordance with the present disclosure are related to implementing a communication system that can use buffer state reporting to facilitate network data traffic/pattern scheduling and transmissions. A protocol data unit (PDU) set can include one or more PDU(s) that includes a payload of a unit of information generated at an application level, such as a frame or video slice for XR or extended reality management (XRM) services. In some implementations, all PDUs in a PDU set may be needed by the application layer to use the corresponding unit of information, or the application layer may be capable of recovering parts of or all of the information unit even if some PDUs are missing. Applications can output multiple PDUs as a data burst (e.g., one or more PDU sets). For example, a transmitter may send PDUs as a data burst, where a set of multiple PDUs are generated and sent by an application in a short period of time (or burst). Each data burst can be composed of multiple PDU sets.

Various quality of services (QoS) rules and/or classifications may be applied to network data traffic (e.g., an IP flow), including PDUs and data bursts. For example, UL/DL traffic classification can be based on packet detection rules for DL and/or a UL traffic filter for UL; various tuples (e.g., source IP, destination IP, source port, destination port, protocol ID) can be used to perform the classification.

With respect to PDUs, a PDU set delay budget (PSDB) can define an upper bound for an amount of time that a PDU set may be delayed between particular points in a network pathway, such as between a device (e.g., user equipment (UE), such as various devices described herein) and an N6 point at a user plane function (UPF). For example, the PDSB can be applied to a DL PDU set received by the UPF over the N6 interface, and to the UL PDU sent by the UE. In the case of network access, the PSDB can support the configuration of scheduling and link layer functions (e.g. the setting of scheduling priority weights and hybrid automatic repeat request (HARQ) target operating points). For a given 5G QoS identifier (5QI), which can indicate one or more QoS parameters or characteristics, the value of the PSDB can be the same for UL and DL. For some classifications of data (e.g., based on particular QoS rules to be applied to the data), a PDU set may be counted as lost if delayed more than the PSDB.

A PDU set discard time (PSDT) can define an upper bound for an amount of time that a PDU set has been waiting for transmission at the sender of a link layer protocol (e.g., RLC in RAN) before being discarded. The PSDT can apply to the DL PDU set received by the UPF over the N6 interface, and to the UL PDU set sent by the UE.

It can be useful to have a latency aware scheduler to address scheduling for XR traffic (e.g., where the XR traffic can have strict latency bounds to satisfy various QoS requirements associated with PDU and PDU set data flows). Buffer state reporting (e.g., UE to gNB) can indicate an amount of data buffered in the UE (e.g., buffered to wait for transmission). Latency information may not be available for data in the buffer to help the scheduler, which can make it challenging to effectively schedule data communications, such as XR traffic, in a manner that addresses latency and/or QoS requirements while also managing PDU set delays and/or buffering.

Systems and methods in accordance with the present disclosure can determine timing information for data in the buffer to provide latency-related signals to facilitate scheduling while taking into account power and overall network traffic considerations. For example, the UE can identify a particular type of data to be communicated, such as to be communicated as a plurality of data bursts, and provide one or more characteristics of the particular type of data to a scheduler to enable the scheduler to manage the communications for multiple data bursts of the plurality of data bursts. As such, a predetermined characteristic related to timing, such as periodicity, can be communicated at a first point in time associated with a first data burst of the plurality of data bursts, and applied by the scheduler for multiple bursts of the plurality of bursts.

For example, the system can filter the uplink traffic between periodic and non periodic traffic. Such filtering can take into account situations in which video frames are of fixed periodicity, with a fixed timing relationship between each frame. The data burst can have the same periodicity as the video frame. The system can more efficiently control (e.g., minimize) the on time for communicating the timing information (e.g., discontinuous reception (DRX) on time; connected DRX on time) by aligning communication of the timing information in a particular relation to CDRX setting communications, such as to communicate the periodicity of the data burst and/or start offset alignment with the CDRX setting. For each data burst, the system can assign a data burst sequence number and a boundary indication (e.g., at least one of start/end time for data burst), which can provide the timing relationship for the data burst and the PDU set delay budget. This can enable the scheduler to calculate the remaining time for the next data burst based on the sequence number of the data burst received.

In some implementations, a device includes a wireless communications interface and one or more processors. The wireless communications interface can communicate a plurality of data packets to a remote device using a network device. The one or more processors can operate an application to generate the plurality of data packets. The one or more processors can identify a subset of data packets each having a particular characteristic, such as periodicity. The one or more processors can transmit, to the network device, an indication of the particular characteristic to facilitate timing of communication of the plurality of data packets. The one or more processors can transmit the indication during a predetermined communication period, such as a DRX period, to reduce overall power usage/network traffic. The indication of the particular characteristic can enable the network device to meet QoS requirements for managing communication of the plurality of data packets, including where the data packets are arranged as data bursts of PDUs.

Although various implementations disclosed herein are provided with respect to wearable devices, principles disclosed herein can be applied to any other type of devices such as handheld, mobile or small form factor devices (e.g., smart phones, tablet computers, laptops, etc.).

FIG. 1 is a block diagram of an example artificial reality system environment 100. In some implementations, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HDM 150, the detected shape, location and/or orientation of the body/hand/face of the user, and/or a user input for the artificial reality, and transmit the image data to the HWD 150 for presentation. In some implementations, the artificial reality system environment 100 includes more, fewer, or different components than shown in FIG. 1. In some implementations, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some implementations, the console 110 is integrated as part of the HWD 150.

In some implementations, the HWD 150 is an electronic component that can be worn by a user and can present or provide an artificial reality experience to the user. The HWD 150 may render one or more images, video, audio, or some combination thereof to provide the artificial reality experience to the user. In some implementations, audio is presented via an external device (e.g., speakers and/or head-phones) that receives audio information from the HWD 150, the console 110, or both, and presents audio based on the audio information. In some implementations, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other implementations, the HWD 150 includes more, fewer, or different components than shown in FIG. 1.

In some implementations, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some implementations, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some implementations, the eye trackers 160 include electronic components or a combination of electronic components and software components that determine a gaze direction of the user of the HWD 150. In some implementations, the HWD 150, the console 110 or a combination of them may incorporate the gaze direction of the user of the HWD 150 to generate image data for artificial reality. In some implementations, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some implementations, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some implementations, a user of the HWD 150 can configure the HWD 150 (e.g., via user settings) to enable or disable the eye trackers 160. In some implementations, a user of the HWD 150 is prompted to enable or disable the eye trackers 160.

In some implementations, the hand tracker 162 includes an electronic component or a combination of an electronic component and a software component that tracks a hand of the user. In some implementations, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some implementations, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some implementations, the image renderer 170 includes an electronic component or a combination of an electronic component and a software component that generates one or more images for display, for example, according to a change in view of the space of the artificial reality. In some implementations, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some implementations, the image data from the console 110 may be encoded, and the image renderer 170 may decode the image data to render the image. In some implementations, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some implementations, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some implementations, the electronic display 175 is an electronic component that displays an image. The electronic display 175 may, for example, be a liquid crystal display or an organic light emitting diode display. The electronic display 175 may be a transparent display that allows the user to see through. In some implementations, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some implementations, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some implementations, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some implementations, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other implementations, the console 110 includes more, fewer, or different components than shown in FIG. 1. In some implementations, the console 110 is integrated as part of the HWD 150.

In some implementations, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some implementations, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some implementations, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some implementations, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
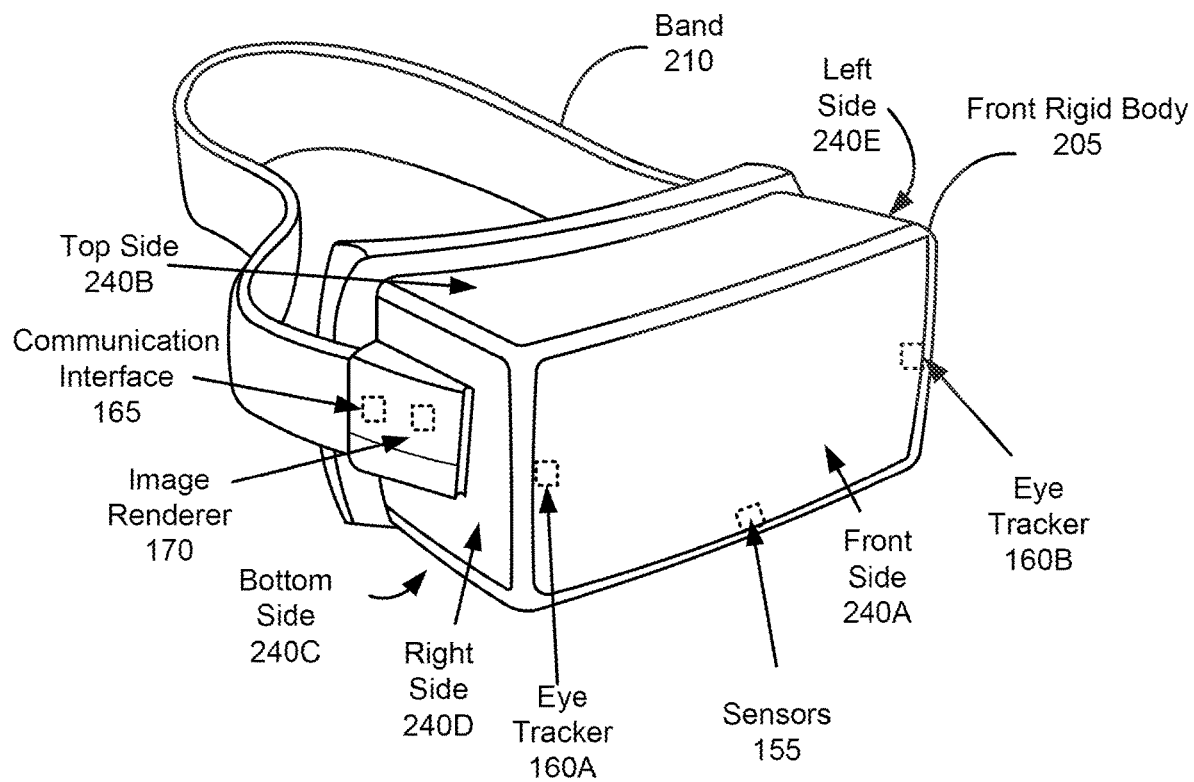
FIG. 2 is a diagram of a head wearable display, according to an example implementation of the present disclosure.

FIG. 2 is a diagram of a HWD 150, in accordance with an example implementation. In some implementations, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the implementation shown by FIG. 2, the communication interface 165, the image renderer 170, and the sensors 155 are located within the front rigid body 205, and may not visible to the user. In other implementations, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
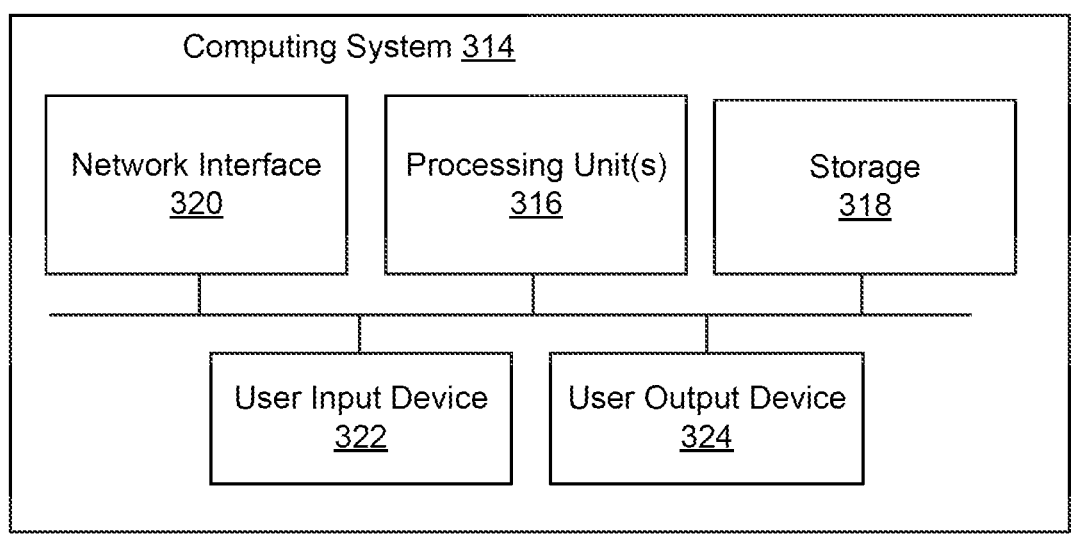
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some implementations, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some implementations, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 4:
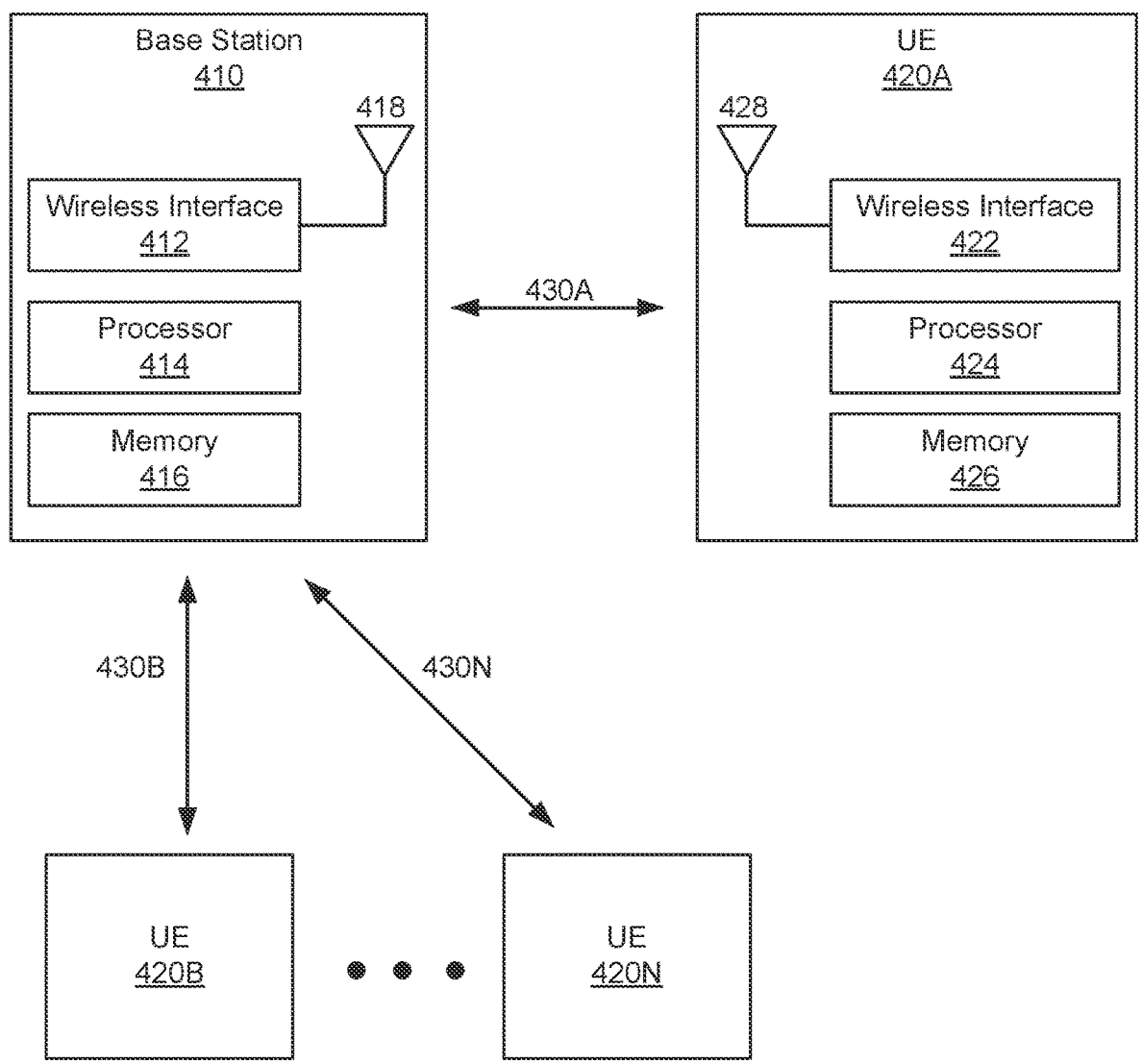
FIG. 4 is a diagram of an example wireless communication system, according to an example implementation of the present disclosure.

FIG. 4 illustrates an example wireless communication system 400. The wireless communication system 400 may include a base station 410 (also referred to as "a wireless communication node 410" or "a station 410") and one or more user equipment (UEs) 420 (also referred to as "wireless communication devices 420" or "terminal devices 420"). The UEs 420 may be or include any device or component described above with reference to FIG. 1-FIG. 3, such as the console 110, head wearable display 150, or the like. The base station 410 and UEs 420 may include components, elements, and/or hardware similar to those described above with reference to FIG. 1-FIG. 3. The base station 410 and the UEs 420 may communicate through wireless commination links 430A, 430B, 430C. The wireless communication link 430 may be a cellular communication link conforming to 3G, 4G, 5G or other cellular communication protocols or a Wi-Fi communication protocol. In one example, the wireless communication link 430 supports, employs or is based on an orthogonal frequency division multiple access (OFDMA). In one aspect, the UEs 420 are located within a geographical boundary with respect to the base station 410, and may communicate with or through the base station 410. In some implementations, the wireless communication system 400 includes more, fewer, or different components than shown in FIG. 4. For example, the wireless communication system 400 may include one or more additional base stations 410 than shown in FIG. 4.

In some implementations, the UE 420 may be a user device such as a mobile phone, a smart phone, a personal digital assistant (PDA), tablet, laptop computer, wearable computing device, etc. Each UE 420 may communicate with the base station 410 through a corresponding communication link 430. For example, the UE 420 may transmit data to a base station 410 through a wireless communication link 430, and receive data from the base station 410 through the wireless communication link 430. Example data may include audio data, image data, text, etc. Communication or transmission of data by the UE 420 to the base station 410 may be referred to as an uplink communication. Communication or reception of data by the UE 420 from the base station 410 may be referred to as a downlink communication. In some implementations, the UE 420A includes a wireless interface 422, a processor 424, a memory device 426, and one or more antennas 428. These components may be embodied as hardware, software, firmware, or a combination thereof. In some implementations, the UE 420A includes more, fewer, or different components than shown in FIG. 4. For example, the UE 420 may include an electronic display and/or an input device. For example, the UE 420 may include additional antennas 428 and wireless interfaces 422 than shown in FIG. 4.

The antenna 428 may be a component that receives a radio frequency (RF) signal and/or transmit a RF signal through a wireless medium. The RF signal may be at a frequency between 200 MHz to 100 GHz. The RF signal may have packets, symbols, or frames corresponding to data for communication. The antenna 428 may be a dipole antenna, a patch antenna, a ring antenna, or any suitable antenna for wireless communication. In one aspect, a single antenna 428 is utilized for both transmitting the RF signal and receiving the RF signal. In one aspect, different antennas 428 are utilized for transmitting the RF signal and receiving the RF signal. In one aspect, multiple antennas 428 are utilized to support multiple-in, multiple-out (MIMO) communication.

The wireless interface 422 includes or is embodied as a transceiver for transmitting and receiving RF signals through a wireless medium. The wireless interface 422 may communicate with a wireless interface 412 of the base station 410 through a wireless communication link 430A. In one configuration, the wireless interface 422 is coupled to one or more antennas 428. In one aspect, the wireless interface 422 may receive the RF signal at the RF frequency received through antenna 428, and downconvert the RF signal to a baseband frequency (e.g., 0~1 GHz). The wireless interface 422 may provide the downconverted signal to the processor 424. In one aspect, the wireless interface 422 may receive a baseband signal for transmission at a baseband frequency from the processor 424, and upconvert the baseband signal to generate a RF signal. The wireless interface 422 may transmit the RF signal through the antenna 428.

The processor 424 is a component that processes data. The processor 424 may be embodied as field programmable gate array (FPGA), application specific integrated circuit (ASIC), a logic circuit, etc. The processor 424 may obtain instructions from the memory device 426, and executes the instructions. In one aspect, the processor 424 may receive downconverted data at the baseband frequency from the wireless interface 422, and decode or process the downconverted data. For example, the processor 424 may generate audio data or image data according to the downconverted data, and present an audio indicated by the audio data and/or an image indicated by the image data to a user of the UE 420A. In one aspect, the processor 424 may generate or obtain data for transmission at the baseband frequency, and encode or process the data. For example, the processor 424 may encode or process image data or audio data at the baseband frequency, and provide the encoded or processed data to the wireless interface 422 for transmission.

The memory device 426 is a component that stores data. The memory device 426 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 426 may be embodied as a non-transitory computer readable medium storing instructions executable by the processor 424 to perform various functions of the UE 420A disclosed herein. In some implementations, the memory device 426 and the processor 424 are integrated as a single component.

In some implementations, each of the UEs 420B . . . 420N includes similar components of the UE 420A to communicate with the base station 410. Thus, detailed description of duplicated portion thereof is omitted herein for the sake of brevity.

In some implementations, the base station 410 may be an evolved node B (eNB), a serving eNB, a target eNB, a femto station, or a pico station. The base station 410 may be communicatively coupled to another base station 410 or other communication devices through a wireless communication link and/or a wired communication link. The base station 410 may receive data (or a RF signal) in an uplink communication from a UE 420. Additionally or alternatively, the base station 410 may provide data to another UE 420, another base station, or another communication device. Hence, the base station 410 allows communication among UEs 420 associated with the base station 410, or other UEs associated with different base stations. In some implementations, the base station 410 includes a wireless interface 412, a processor 414, a memory device 416, and one or more antennas 418. These components may be embodied as hardware, software, firmware, or a combination thereof. In some implementations, the base station 410 includes more, fewer, or different components than shown in FIG. 4. For example, the base station 410 may include an electronic display and/or an input device. For example, the base station 410 may include additional antennas 418 and wireless interfaces 412 than shown in FIG. 4.

The antenna 418 may be a component that receives a radio frequency (RF) signal and/or transmit a RF signal through a wireless medium. The antenna 418 may be a dipole antenna, a patch antenna, a ring antenna, or any suitable antenna for wireless communication. In one aspect, a single antenna 418 is utilized for both transmitting the RF signal and receiving the RF signal. In one aspect, different antennas 418 are utilized for transmitting the RF signal and receiving the RF signal. In one aspect, multiple antennas 418 are utilized to support multiple-in, multiple-out (MIMO) communication.

The wireless interface 412 includes or is embodied as a transceiver for transmitting and receiving RF signals through a wireless medium. The wireless interface 412 may communicate with a wireless interface 422 of the UE 420 through a wireless communication link 430. In one configuration, the wireless interface 412 is coupled to one or more antennas 418. In one aspect, the wireless interface 412 may receive the RF signal at the RF frequency received through antenna 418, and downconvert the RF signal to a baseband frequency (e.g., 0~1 GHz). The wireless interface 412 may provide the downconverted signal to the processor 424. In one aspect, the wireless interface 422 may receive a baseband signal for transmission at a baseband frequency from the processor 414, and upconvert the baseband signal to generate a RF signal. The wireless interface 412 may transmit the RF signal through the antenna 418.

The processor 414 is a component that processes data. The processor 414 may be embodied as FPGA, ASIC, a logic circuit, etc. The processor 414 may obtain instructions from the memory device 416, and executes the instructions. In one aspect, the processor 414 may receive downconverted data at the baseband frequency from the wireless interface 412, and decode or process the downconverted data. For example, the processor 414 may generate audio data or image data according to the downconverted data. In one aspect, the processor 414 may generate or obtain data for transmission at the baseband frequency, and encode or process the data. For example, the processor 414 may encode or process image data or audio data at the baseband frequency, and provide the encoded or processed data to the wireless interface 412 for transmission. In one aspect, the processor 414 may set, assign, schedule, or allocate communication resources for different UEs 420. For example, the processor 414 may set different modulation schemes, time slots, channels, frequency bands, etc. for UEs 420 to avoid interference. The processor 414 may generate data (or UL CGs) indicating configuration of communication resources, and provide the data (or UL CGs) to the wireless interface 412 for transmission to the UEs 420.

The memory device 416 is a component that stores data. The memory device 416 may be embodied as RAM, flash memory, ROM, EPROM, EEPROM, registers, a hard disk, a removable disk, a CD-ROM, or any device capable for storing data. The memory device 416 may be embodied as a non-transitory computer readable medium storing instructions executable by the processor 414 to perform various functions of the base station 410 disclosed herein. In some implementations, the memory device 416 and the processor 414 are integrated as a single component.

In some implementations, communication between the base station 410 and the UE 420 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 5:
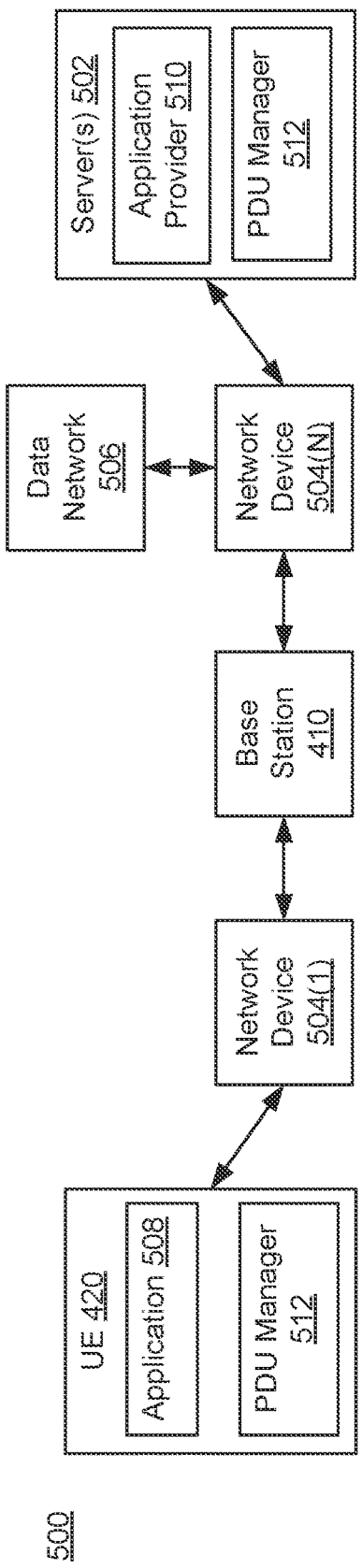
FIG. 5 is a block diagram of a system for latency-aware network communications, according to an example implementation of the present disclosure.

Referring now to FIG. 5, depicted is a block diagram of a system 500 that can implement operations including facilitating latency-aware network communications, according to an example implementation of the present disclosure. The system 500 may include user equipment (UE) 420 communicably coupled to one or more server(s) 502. The UE 420 may be the same as or similar to the UE 420 described above with reference to FIG. 4. The UE 520 may be communicably coupled to the server(s) 502 via various network devices 504 and base station 410. The base station 410 may be the same as or similar to the base station 410 described above with reference to FIG. 4. The network devices 504 may be or include any networking device, component, or node along the network path between the UE 420 and server(s) 502. For example, the network devices 504 may include routers, switches, or any other network nodes. In various implementations, the server(s) 502 may be configured to communicate with a data network 506 (e.g., a trusted data network 506) via a network exposure function and/or policy control function). The server(s) 502 may be configured to communicate data via a user plane function (UPF) to the base station 410 (e.g., a radio access network [RAN]), and the base station 410 may route the data from the server(s) 502 via various network devices 504 to the UE 420.

The UE 520 may be configured to execute an application 508 hosted by an application provider 510 on the server(s) 502. In various implementations, the application 508 may be an extended reality (XR) application (e.g., an augmented reality (AR), virtual reality (VR), mixed reality (MR), or other XR application). The application 508 executing on the UE 420 may generate data for transmission to the server 502 (and vice versa). The UE 420 (or server 502) may be configured to transmit the data along the network path shown in FIG. 5 and described above to the endpoint or destination (e.g., to the server 502 or UE 420).

A device or node along the network path may include a PDU manager 512. The PDU manager 512 may be or include any device, component, element, or hardware designed or configured to implement, deploy, use, or otherwise execute a PDU set discard policy, to selectively discard and/or process PDUs 602 of a PDU set 604 (e.g., as described with reference to FIG. 6). While shown as included in the UE 420 and server(s) 502, in various implementations, each node (e.g., the network devices 504, base station 410, data network 506, etc.) may execute or include an instance of the PDU manager 512. In some implementations, the PDU manager 512 may be configured to execute a PDU-set delay budget (PSDB). The PSDB may define an upper bound for the time that a PDU set 604 may be delayed between two nodes of the network path (e.g., between the UE 420 and base station network device 504(1), network device 504(1) and base station 410, base station 410 and network device 504(N), and/or network device 504(N) and sever(s) 502). In various implementations, the PSDB may define an upper bound for the time that a PDU set 604 may be delayed for both downlink (DL) and/or uplink (UL) traffic. For certain cellular quality of service (QoS) identifiers (e.g., 5QI), the values for the PSDB for UL and DL traffic may be the same. In the case of network access, the PSDB may be used to support the configuration of scheduling and link layer functions. In some implementations, the PDU manager 512 may be configured to execute a PDU set discard time (PSDT). The PSDT may be an upper bound for the time that a PDU set 604 is to wait for transmission (e.g., in a buffer, such as buffer 704 described with reference to FIG. 7) at the sender of a link layer protocol before being discarded. Similar to the PSDB, the PSDT may be applied to both UL and DL traffic.

As described in greater detail below, the PDU manager 512 may be configured to selectively discard PDU sets 604 and/or data bursts 606 based on or according to the PDU set discard policy and/or data burst discard policy. For example, the PDU manager 512 may be configured to selectively discard PDU sets 604 and/or data bursts 606, based on or according to a count of PDUs 602 (e.g., of a PDU set 604 and/or of a data burst 606) received or otherwise identified by the PDU manager 512 within a time window. The time window may be, for example, set according to one of the discard policies. For instance, the time window may be a duration starting from receipt of a first PDU 602 of a PDU set 604. The PDU manager 512 may be configured to count the number of PDUs 602 received within the time window, and apply the PDU set discard policy and/or data burst discard policy to the received PDUs 602, to selectively discard (or process) the PDU set 604 and/or data burst 606. The PDU manager 512 may be configured to discard the PDU set 604 and/or data burst 606 by deleting the PDU sets 604 (e.g., each PDU 602 which are linked to a common PDU set 604) or data burst 606 (e.g., each PDU set 604 sent in a common data burst 606) from memory, by removing the PDU sets 604 and/or data bursts 606 from a buffer, by dropping the PDU sets 604 and/or data bursts 606 from a transmission schedule for transmission, etc. The PDU manager 512 may be configured to process the PDU sets 604 (or data bursts 606) by transmitting the PDU sets 604 or data bursts 606 received from a buffer (e.g., from the application layer following the application 508 moving the PDU sets 604 to the buffer) to the next node along the network path, by pushing the PDU sets 604 (or data bursts 606) to the application layer for decoding and use by the application 508, etc.

The base station 410 can provide instructions for the UE 420 to perform transmission of PDUs 602 according to the instructions, such as for performing DRX and/or CDRX operations. For example, the UE 420 can operate in a DRX mode in which the UE 420 uses a first amount of power in an on mode (e.g., ON duration) during which the UE 420 can provide power to the wireless interface 412 for receiving incoming data, and a second amount of power in an off mode (e.g., OFF duration) during which the UE 420 provides no or less power than the first amount of power to the wireless interface 412. By performing DRX operations, the UE 420 can limit the amount of time (and thus can limit the amount of power used) during which the wireless interface 412 is operating to receive incoming data; for example, the wireless interface 412 can be off or in a sleep state during the OFF duration, and can wake up to receive incoming data during the ON duration. The UE 420 may not receive data form the base station 410 during the OFF duration periods, which can affect latency.

The instructions can indicate at least one of a length (in time, e.g., milliseconds) of the ON duration or an offset for the ON duration. The offset can be an amount of time from a start of a baseline (e.g., start of subframe time), such as to allow the base station 410 to schedule communications with multiple UEs 420. The UE 420 can operate in the ON duration (e.g., provide the first amount of power to the wireless interface 412 during the ON duration for the wireless interface 412 to receive data from the base station 410) according to the at least one of the length or the offset.

Figure 6:
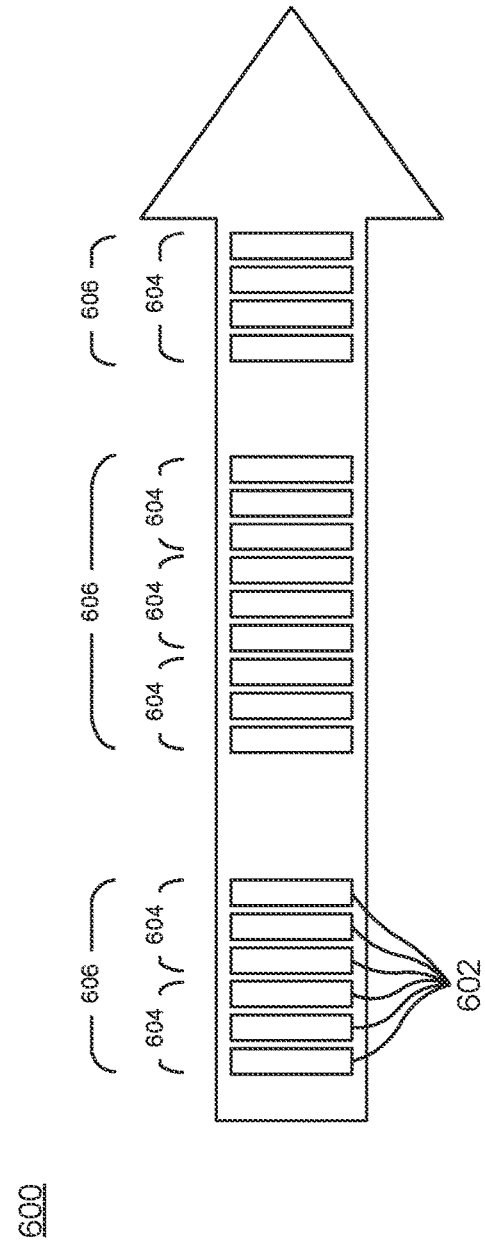
FIG. 6 is a diagram of traffic flow from a sender device to a receiver device, according to an example implementation of the present disclosure.

Referring now to FIG. 6, depicted is a diagram of traffic flow 600 from a sender device to a receiver device, according to an example implementation of the present disclosure. In some implementations, the sender device may be the UE 420 and the receiver device may be the server 502. In some implementations, the sender device may be a network device 504 and the receiver device may be the base station 410. In some implementations, the sender device may be the base station 410 and the receiver device may be the server 502 and/or the UE 420. In this regard, the sender device and receiver device may be or include any node along the network path shown in FIG. 5.

As shown in FIG. 6, the traffic flow 600 may include protocol data units (PDUs) 602 which may be grouped or otherwise sent in a PDU set 604. In some implementations, multiple PDU sets 604 may be sent in a data burst 606. In this regard, a sender device may generate a PDU set 604 including one or more PDUs 602. Each PDU 602 may include, contain, or otherwise carry various unit(s) of information generated at the application level (e.g., by the application 508, for example). For example, where the application 508 is an XR application, a PDU 602 may include a frame or video slice for the XR application. In some implementations, each of the PDUs 602 in the PDU set are needed by the application 508 (or the receiver device) to use the corresponding unit of information.

One or more PDUs 602 (and/or PDU sets 604) can be subject to timing criteria for transmission of the PDUs 602. For example, the PDU 602 can be subject to timing criteria such as a threshold duration (e.g., upper bound) that the PDU 602 is in a buffer (e.g., in the traffic flow 600; in a buffer 704 described with reference to FIG. 7) for transmission before being discarded, such that the PDU manager 512 can discard the PDU 602 responsive to an amount of time that the PDU 602 is in the buffer meeting or exceeding the threshold duration. This can be useful, for example, for latency-sensitive communications in which PDUs 602 may represent data that if not communicated in time may not be useful for a receiving device. XR data, such as video frames for XR, can be examples of such latency-sensitive communications for which the timing criteria and discard are useful. The timing criteria can include at least one of the PSDB or the PSDT. The UE 420 (e.g., PDU manager 512) can determine an indication of a remaining time that a given PDU 602 has to be in the buffer until the threshold duration of the timing criteria will be met or exceeded. For example, if the threshold duration is 80 ms, and the UE 420 determines that the given PDU 602 has been in the buffer for 50 ms, the UE 420 can determine the remaining time to be 30 ms.

Figure 7:
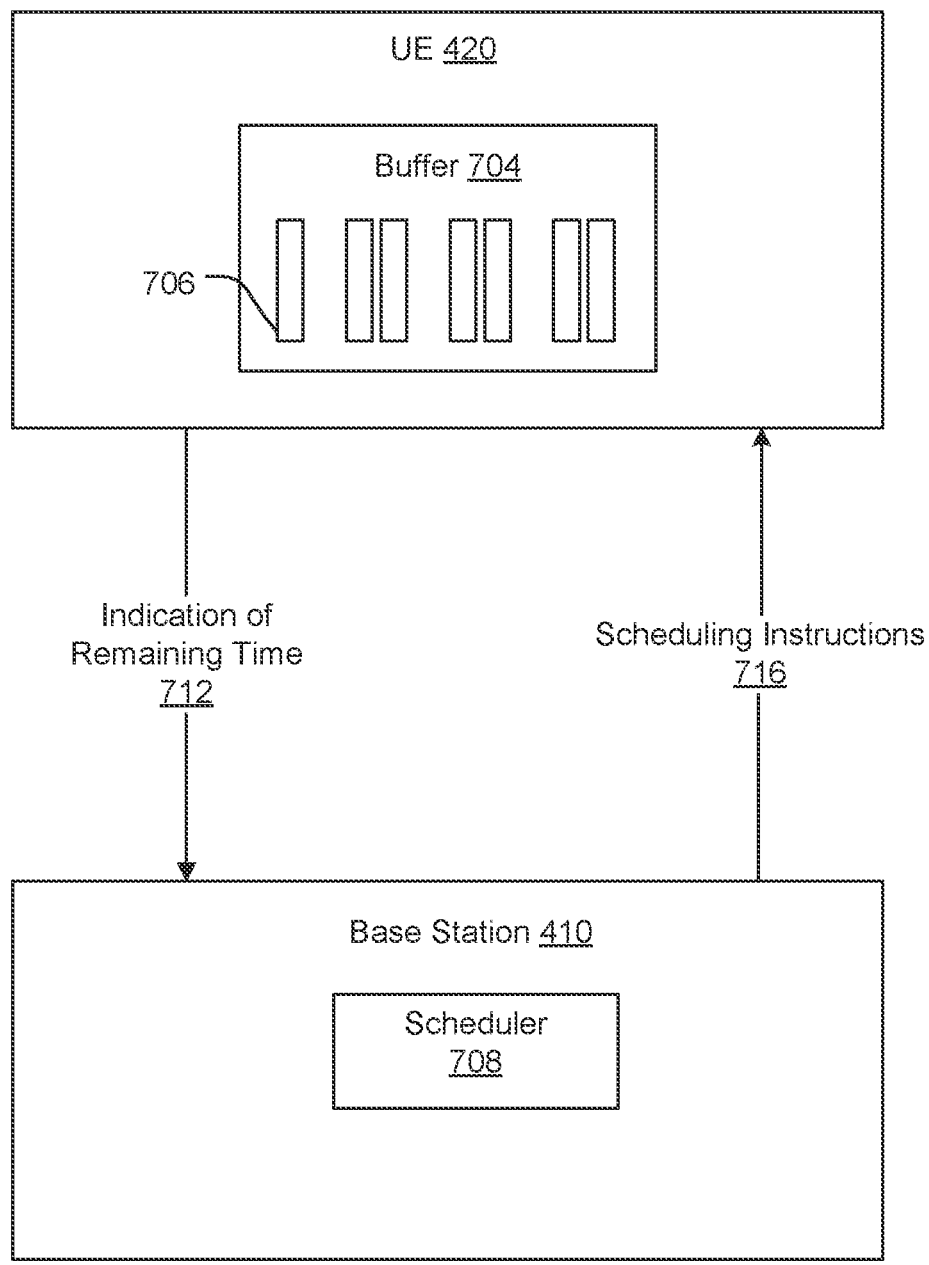
FIG. 7 is a diagram depicting a process for facilitating latency-aware network communications, according to an example implementation of the present disclosure.

FIG. 7 depicts an example of a process 700 implemented by the UE 420 and/or base station 410 to facilitate latency-aware scheduling of network data communications, such as by timing information communication, buffer state reporting, and/or data burst alignment. For example, the process 700 can be performed to facilitate transmission of data of the traffic flow 600 in a manner that at least one of satisfies QoS requirements or reduces power consumption by the UE 420.

As depicted in FIG. 7, the UE 420 can have a buffer 704 of data packets 706 to communicate to the base station 410. The data packets 706 can be generated by the application 508. For example and without limitation, the data packets 706 can represent data for generating and presenting XR content (e.g., video frames) to a user of the UE 420. The data packets 706 can include PDUs 602, PDU sets 604, and/or data bursts 606 as described with reference to FIG. 6.

The buffer 704 can be a queue for transmission of data packets 706 by the UE 420 or one or more components thereof. For example, the buffer 704 can be a queue in which data packets 706, subsequent to being generated by the application 508, are maintained (e.g., stored, held) and advanced through the queue until a given data packet 706 is first in the queue and can be transmitted by the UE 420. The data packets 706 can be arranged a sequence in the buffer 704, and can be assigned a sequence number indicative of at least one of a relative position or an absolute position of the data packets 706 in the sequence.

The UE 420 can monitor a timing characteristic of the data packets 706. The timing characteristic can represent times at which the data packets are generated and/or transmitted by the UE 420. For example, the timing characteristic can be a periodicity of the data packets 706. The periodicity can indicate a rate at which the data packets 706 are to transmitted, such as a time between transmission of consecutive data packets 706. The periodicity, in some implementations, can be fixed. For example, for at least a subset of the data packets 706, the periodicity of the subset of data packets 706 can be constant or expected to be constant (e.g., after the first data packet 706 of the subset, the time difference of transmission of a given data packet 706 relative to a prior (or subsequent) data packet 706 is the same). Some data packets 706 other than those of the subset 706 may not have periodicity or fixed periodicity. The data packets 706 having fixed periodicity can be used for video frames, such as for facilitating presentation of a sequence of image and/or video frames for presenting XR content. In some implementations, the periodicity of the subset of the data packets 706 corresponds to (e.g., is equal or proportional to) a frame rate of the video frames.

As described above with respect to PDUs 602 of FIG. 6, one or more data packets 706 can be subject to timing criteria. In some implementations, the UE 420 selects, from the data packets 706 in the buffer 704, a subset of data packets 706 that have fixed periodicity (e.g., based on identification information indicating the periodicity and/or that the subset of data packets 706 represent image and/or video frames to be presented at a frame rate), and identify one or more timing criteria to apply to the selected subset of data packets 706. For example, the UE 420 can apply a threshold duration for having the data packets 706 that have fixed periodicity (as well as at least some data packets 706 that do not have fixed periodicity) in the buffer 704, such that the UE 420 can discard a given data packet 706 responsive to a duration that the given data packet 706 is (e.g., has been) in the buffer 704 meeting or exceeding the threshold duration.

The UE 420 can determine an indication of remaining time 712 for the given data packet 706 according to the timing criteria. For example, where the timing criteria includes a threshold representing an upper bound for an amount of time that the given data packet 706 (e.g., a PDU set) has been waiting for transmission (e.g., at the sender of a link layer protocol (e.g., RLC in RAN)) before being discarded, the UE 420 can determine the remaining time according to a difference between (1) the amount of time that the given data packet 706 has been in the buffer 704 and/or has been waiting for transmission from the buffer 704 and (2) the threshold. For example, if the threshold of the timing criteria is 100 ms (e.g., the UE 420 is to discard data packets 706 that are held in the buffer 704 waiting for transmission for more than 100 ms), and the given data packet 706 has been in the buffer 704 for 40 ms, the UE 420 can determine the remaining time to be 60 ms. The UE 420 can generate the indication 712 to be representative of the remaining time, including but not limited to using a sequence number of the given data packet 706 to indicate the remaining time (e.g., for data packets 706 having fixed periodicity, the sequence number, the fixed periodicity, and a start/end time for the data packets 706 or a data burst 606 of the data packets 706 can be used to determine the remaining time).

As depicted in FIG. 7, the UE 420 can transmit the indication 712 to the base station 410. The base station 410 can include a scheduler 708 that can receive the indication 712 and determine scheduling instructions 716 for operation of the UE 420 according to the indication 712. The scheduler 708 can determine the scheduling instructions 716 to indicate to the UE 420 a timing for communication of the selected data packets 706 from the buffer 704 to the base station 410. For example, the scheduler 708 can determine the scheduling instructions 716 according to a DRX mode for operation of the UE 420, such as to indicate at least one of a length of an ON duration for the UE 420 to be on to receive data or an offset for the ON duration relative to a subframe start time.

The UE 420 can receive the scheduling instructions 716 and transmit the selected data packets 706 according to the scheduling instructions 716. For example, the UE 420 can determine to transmit the selected data packets 706 according to the at least one of the ON duration or the offset for the ON duration, such as to transmit the selected data packets 706 during the ON duration. This can allow the UE 420 to maintain the power savings enabled by DRX operation while avoiding latency issues from delay of data packet transmission and/or avoiding quality issues from discard of data packets 706.

Figure 8:
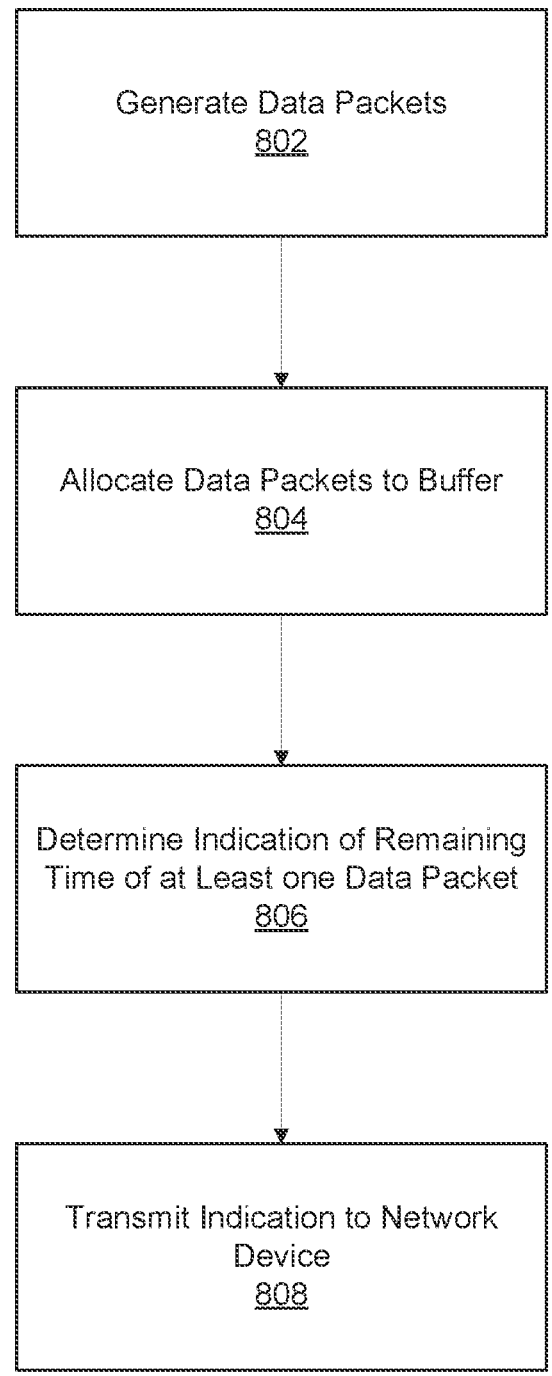
FIG. 8 is a flow chart of a method of latency-aware network communications, according to an example implementation of the present disclosure.

FIG. 8 shows a block diagram of a representative method 800 for indication of data packet communication timing. In some implementations, the method 800 can be implemented by a device, such as a UE, configured to communicate with a second device, such as a base station, using a wireless connection. In brief overview, the method can include generating 802 a plurality of data packets. The method can include allocating 804 the plurality of data packets to a buffer for transmission to the network device. The method can include determining 806 an indication of a remaining time for transmission of at least one data packet of the plurality of data packets. The method can include transmitting 808, using a wireless communication interface of the device, the indication of the remaining time to the network device. In some implementations, the method 800 can be performed by the wearable device 110 or the wearable device 150. In some implementations, the method 800 can be performed by other entities. In some implementations, the method 800 includes more, fewer, or different steps than shown in FIG. 8.

Referring to FIG. 8 in further detail, one or more processors of the device can generate 802 a plurality of data packets. The data packets can be generated by an application, such as an XR application, of the device. The data packets can be formatted as one or more PDUs, such as to be arranged as PDU sets for communication as one or more data bursts. For example, the one or more processors can generate the data packets to include multiple data packets representing video frame of XR data to be communicated in one or more data bursts (e.g., at a fixed periodicity). In some implementations, at least a subset of the data packets have a periodicity. For example, the data packets can have a fixed periodicity, such as by being generated and/or scheduled for communication at periodic times, e.g., in accordance with a frame rate associated with XR content represented by the data packets. The data packets can be arranged in data bursts, such as to have a plurality of first data packets forming a first data burst and a plurality of second data packets forming a second data burst, the first data burst having a first period between consecutive packets of the plurality of first data packets, the second data burst having a second period between consecutive packets of the plurality of second data packets, the first period and the second period each less than a third period between the first data burst and the second data burst.

The data packets can be subject to one or more timing criteria for transmission of the data packets to a destination (e.g., the network device or other node or device for reception of the data packets, including but not limited to a user plane function or RAN). The timing criteria can include an upper bound for an amount of time that a given data packet (e.g., PDU set) may be delayed between particular points in a network pathway of communication from the device.

The one or more processors can allocate 804 the plurality of data packets to a buffer for transmission to the network device. The buffer can be structured as a queue for transmission of data packets, such as to order the data packets sequentially for output. Each data packet (e.g., each PDU or PDU set) can be assigned a sequence number representing a position of the data packet relative to one or more other data packets in the order for output.

The one or more processors can determine 806 an indication of a remaining time for transmission of at least one data packet of the plurality of data packets. The one or more processors can select the at least one data packet responsive to the at least one data packet having a fixed periodicity (e.g., the at least one data packet being of the subset of the plurality of data packets that represent XR video frames). The one or more processors can determine the indication according to an amount of time for the at least one data packet to be in the buffer before one or more timing criteria applicable to the at least one data packet expire. For example, the one or more processors can determine the indication to represent the remaining time before the amount of time that the at least one data packet can be delayed in the buffer (e.g., can be allowed to wait in the buffer to be transmitted) expires. For example, responsive to the amount of time (e.g., upper bound) being 60 ms, and the at least one data packet having the fixed periodicity being in the buffer for 40 ms, the one or more processors can determine the indication to represent a remaining time of 20 ms before the at least one data packet is to be discarded. The indication can include, for example and without limitation, any of various timing information that can be used to identify of the remaining time and/or operation of the wireless interface of the device (e.g., ON duration, start time, and/or end time of DRX cycles implemented by the device; periodicity of the identified at least one data packet(s); or various combinations thereof). For example, the one or more processors can generate the indication to include the offset between the start time of reception during the ON duration and a start time of transmission of the at least one data packet. The indication can include or be provided in a buffer status report that the one or more processors generate regarding the buffer.

The one or more processors can transmit 808, using the wireless communications interface (e.g., cause transmission of by the wireless communications interface), the indication of the remaining time to the network device. For example, the indication can be transmitted during the ON duration of a DRX cycle of communication by the device. In some implementations, the device can receive (e.g., during the ON duration of the DRX cycle or a subsequent DRX cycle) instructions from the network device for scheduling of communication of the at least one data packet, such as instructions for when to operate the wireless interface in the ON duration for the subsequent DRX cycle for transmission of the at least one data packet (e.g., responsive to the network device determining the instructions to avoid discard of the at least one data packet in accordance with QoS criteria for the at least one data packet). The indication can be transmitted before the transmission of the at least one data packet.

Some implementations include electronic components, such as microprocessors, storage and memory that store computer program instructions in a computer readable storage medium (e.g., non-transitory computer readable medium). Many of the features described in this disclosure can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, the processors 316 can provide various functionality for the computing system 314, including any of the functionality described herein as being performed by a server or client, or other functionality associated with message management services.

It will be appreciated that the computing system 314 is illustrative and that variations and modifications are possible. Computer systems used in connection with the present disclosure can have other capabilities not specifically described here. Further, while the computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the implementations disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary implementation, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or implementation, and references to "an implementation," "some implementations," "one implementation" or the like are not necessarily mutually exclusive and are intended to indicate that a particular feature, structure, or characteristic described in connection with the implementation can be included in at least one implementation or implementation. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary implementations, and that such variations are intended to be encompassed by the present disclosure.

What is claimed is:

1. A device, comprising:
   a wireless communications interface to communicate a plurality of data packets to a network device; and
   one or more processors to:
   generate the plurality of data packets;
   allocate the plurality of data packets to a buffer for transmission to the network device;
   determine an indication of a remaining time, for transmission of at least one data packet of the plurality of data packets, until a threshold duration at which the at least one data packet is to be discarded; and
   transmit, by the one or more processors using the wireless communications interface, the indication of the remaining time to the network device.

2. The device of claim 1, wherein the wireless communications interface is to operate, for wireless data reception, in an on mode or an off mode, and to transmit the indication of the remaining time during operation in the on mode.

3. The device of claim 1, wherein the indication of the remaining time corresponds to an amount of time before the threshold duration expires.

4. The device of claim 1, wherein the one or more processors are to select the at least one data packet from the plurality of data packets responsive to the at least one data packet having a fixed periodicity.

5. The device of claim 1, wherein the one or more processors are configured to:
   receive, from the network device, an instruction of a period for the wireless communications interface to operate in an on mode; and
   cause the wireless communications interface to transmit the at least one data packet during the period.

6. The device of claim 1, wherein the one or more processors are configured to generate the indication of the remaining time to include an offset between a start time of reception by the wireless communications interface and a start time of transmission of the at least one data packet.

7. The device of claim 1, wherein the one or more processors are configured to transmit, using the wireless communications interface, the indication of the remaining time for transmission of the at least one data packet prior to transmission of the at least one data packet to the network device.

8. The device of claim 1, wherein the one or more processors are to use the wireless communications interface to communicate the plurality of data packets as a plurality of first data packets forming a first data burst and a plurality of second data packets forming a second data burst, the first data burst having a first period between consecutive packets of the plurality of first data packets, the second data burst having a second period between consecutive packets of the plurality of second data packets, the first period and the second period each less than a third period between the first data burst and the second data burst.

9. The device of claim 1, wherein the indication comprises a buffer status report of the buffer.

10. A system, comprising:
    a first device, comprising:
    one or more first processors to determine an indication of a remaining time for transmission of a plurality of data packets allocated to a buffer, the remaining time corresponding to a threshold duration at which the plurality of data packets are to be discarded from the buffer; and
    a second device, comprising:
    one or more second processors to:
    receive the indication from the first device; and
    determine, according to the indication, instructions for timing for the first device to transmit the plurality of data packets from the buffer.

11. The system of claim 10, wherein the first device comprises a wireless communications interface configured to:
    operate, for wireless data reception, in an on mode or an off mode; and
    transmit the indication of the remaining time during operation in the on mode.

12. The system of claim 10, wherein the plurality of data packets have a fixed periodicity.

13. The system of claim 10, wherein the one or more first processors are configured to generate the indication of the remaining time to include an offset between a start time of reception by a wireless communications interface of the first device and a start time of transmission of at least one data packet of the plurality of data packets.

14. The system of claim 10, wherein the one or more first processors are configured to transmit, using a wireless communications interface of the first device, the indication of the remaining time for transmission of at least one data packet of the plurality of data packets prior to transmission of the at least one data packet to the network device.

15. The system of claim 10, wherein the plurality of data packets comprise a plurality of protocol data units (PDUs) arranged as a plurality of PDU sets.

16. A method, comprising:
    generating, by one or more processors, a plurality of data packets;
    allocating, by the one or more processors, the plurality of data packets to a buffer for transmission to a network device;
    determining, by the one or more processors, an indication of a remaining time, for transmission of at least one data packet of the plurality of data packets, until a threshold duration at which the at least one data packet is to be discarded; and
    transmitting, by the one or more processors using a wireless communications interface, the indication of the remaining time to the network device.

17. The method of claim 16, further comprising transmitting, by the wireless communications interface, the indication of the remaining time during operation of the wireless communications interface in an on mode of a discontinuous reception cycle.

18. The method of claim 16, further comprising determining, by the one or more processors, the indication of the remaining time according to an amount of time until the threshold duration expires.

19. The method of claim 16, further comprising selecting, by the one or more processors, the at least one data packet from the plurality of data packets responsive to the at least one data packet having a fixed periodicity.

20. The method of claim 16, further comprising:
    receiving, by the one or more processors from the network device, an instruction of a period for the wireless communications interface to operate in an on mode; and
    causing, by the one or more processors, the wireless communications interface to transmit the at least one data packet during the period.

* * * * *